United States Patent
Arai

(10) Patent No.: US 8,696,510 B2
(45) Date of Patent: Apr. 15, 2014

(54) DRIVELINE FOR FOUR-WHEEL DRIVE VEHICLE

(75) Inventor: Masayuki Arai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 239 days.

(21) Appl. No.: 13/421,515

(22) Filed: Mar. 15, 2012

(65) Prior Publication Data

US 2012/0260758 A1 Oct. 18, 2012

(30) Foreign Application Priority Data

Apr. 13, 2011 (JP) .................................. 2011-088968

(51) Int. Cl.
*F16H 48/06* (2006.01)

(52) U.S. Cl.
USPC .............................................. 475/220; 74/405

(58) Field of Classification Search
USPC ............ 475/220, 221, 223, 230, 317; 477/70, 477/79, 86, 168, 174; 74/405
See application file for complete search history.

(56) References Cited

U.S. PATENT DOCUMENTS

| | | | |
|---|---|---|---|
| 6,634,978 B2 * | 10/2003 | Banno et al. ................... | 475/222 |
| 7,743,899 B2 * | 6/2010 | Capito ........................... | 192/54.3 |
| 8,083,041 B2 * | 12/2011 | Capito et al. ................ | 192/13 R |
| 2006/0142109 A1 * | 6/2006 | Williams et al. ............... | 475/210 |
| 2007/0034475 A1 * | 2/2007 | Capito ...................... | 192/85 CA |
| 2009/0076696 A1 * | 3/2009 | Perkins et al. ................... | 701/69 |
| 2009/0229905 A1 | 9/2009 | Kato et al. | |
| 2011/0256976 A1 * | 10/2011 | Burgbacher et al. .......... | 475/198 |

FOREIGN PATENT DOCUMENTS

| | | |
|---|---|---|
| JP | A-63-087322 | 4/1988 |
| JP | A-2000-198367 | 7/2000 |
| JP | A-2001-301482 | 10/2001 |
| JP | A-2002-295674 | 10/2002 |
| JP | A-2002-370557 | 12/2002 |
| JP | A-2004-009954 | 1/2004 |
| JP | A-2004-324676 | 11/2004 |
| JP | A-2008-261419 | 10/2008 |
| JP | A-2009-220593 | 10/2009 |

* cited by examiner

*Primary Examiner* — David D Le
*Assistant Examiner* — David J Hlavka
(74) *Attorney, Agent, or Firm* — Oliff PLC

(57) ABSTRACT

A driveline includes a wet multi-plate clutch that can switch between a two-wheel drive state and a four-wheel drive state, and a disconnect mechanism that switches transmission/non-transmission of torque between a front differential and one of front wheels. When the driveline is switched from the two-wheel drive state to the four-wheel drive state, the wet multi-plate clutch is actuated to an engagement side, and thus the rotation of the front differential and that of the front wheels are synchronized, and after synchronization is finished, the disconnect mechanism is switched to the transmission state. After switching of the disconnect mechanism is finished, the wet multi-plate clutch is actuated to a disengagement side and returns to a standby position between a disengagement position in the two-wheel drive state and a synchronous position in which the disconnect mechanism is switched.

7 Claims, 4 Drawing Sheets

DRIVELINE FOR FOUR-WHEEL DRIVE VEHICLE

INCORPORATION BY REFERENCE

The disclosure of Japanese Patent Application No. 2011-088968 filed on Apr. 13, 2011 including the specification, drawings and abstract is incorporated herein by reference in its entirety.

BACKGROUND OF THE INVENTION

1. Field of the Invention

The present invention relates to a driveline for a four-wheel drive vehicle that can switch between a two-wheel drive state and a four-wheel drive state.

2. Description of the Related Art

Some four-wheel drive vehicles can change its drive state between a two-wheel drive that is suitable for ordinary running on a high stability dry road and has good gas mileage and a four-wheel drive that is suitable for running in rain or snow or on a rough road. A driveline of such the four-wheel drive vehicle includes a 2WD/4WD switching mechanism that is provided in a transfer (power distribution mechanism) and can switch between the two-wheel drive state and the four-wheel drive state.

In the related art, for example, Japanese Patent Application Publication No. 2004-324676 discloses a 2WD/4WD switching mechanism that is operated by forming a cam groove on an outer peripheral surface of a cylindrical cam, fitting a fork to the cam groove, and rotating the cam with an actuator such as an electrically driven motor to displace the fork in an axial direction by following the shape of the cam groove.

Furthermore, the related art that includes a disconnect mechanism (ADD mechanism) that switches transmission/non-transmission of torque between one of right and left wheels (for example, front wheels) as driven wheels in the two-wheel drive state and a differential mechanism (for example, front differential) that is provided between the right and the left wheels is known. The driveline that includes such the disconnect mechanism can achieve improvement in fuel efficiency during the two-wheel drive state by not transmitting torque between the differential mechanism and one of wheels and thereby achieving a non-rotating state of a differential case or a drive axle in the differential mechanism.

Here, as the 2WD/4WD switching mechanism, when a wet clutch is employed instead of a so-called sleeve lock type, energy regenerative efficiency in deceleration of a hybrid vehicle, for example, can be improved; however, a following problem is concerned. That is, there is a problem that it is hard to achieve the improvement in switching responsivity from the two-wheel drive state to the four-wheel drive state and the improvement in fuel efficiency at the same time.

Specifically, in view of the improvement in changing responsivity, it is desirable to reduce a gap between friction plates of the wet clutch. However, when the gap between the friction plates is reduced, a shearing resistance (drag resistance) of oil or a frictional resistance due to contact of the friction plates increases, and therefore the problem arises such that losses increase. Furthermore, in the driveline that includes such the disconnect mechanism, during the two-wheel drive state, the wet clutch becomes a fully differential state, that is, rotating difference between the friction plates becomes maximum, and therefore seizure might occur if the gap between the friction plates would be small.

On the other hand, in view of the improvement in fuel efficiency or seizure prevention, it is desirable to increase the gap between the friction plates of the wet clutch. However, when the gap between the friction plates is increased, changing time that is required for changing from the two-wheel drive state to the four-wheel drive state gets longer, and therefore the problem arises such that the responsivity deteriorates.

SUMMARY OF THE INVENTION

In view of the above problems, the present invention provides a driveline for a four-wheel drive vehicle that includes a wet clutch that switches between a two-wheel drive state and a four-wheel drive state, and a disconnect mechanism that, in the two-wheel drive state, switches to a non-transmission state in which torque is not transmitted between one of right and left wheels as driven wheels and a differential mechanism that is provided between the right and the left wheels, and in the four-wheel drive state, switches to a transmission state in which torque is transmitted between the differential mechanism and the one of the right and the left wheels. In the driveline, when the driveline is switched from the two-wheel drive state to the four-wheel drive state, the wet clutch is actuated to an engagement side, and thus the rotation of the differential mechanism and that of the one of the wheels are synchronized, and after synchronization is finished, the disconnect mechanism is switched to the transmission state, and after switching is finished, the wet clutch is actuated to a disengagement side and returns to a standby position between a disengagement position in the two-wheel drive state and a synchronous position in which the disconnect mechanism is switched.

According to the driveline for a four-wheel drive vehicle which has the above structure, when the driveline is switched from the two-wheel drive state to the four-wheel drive state, after the switching of the disconnect mechanism to the transmission state is finished, the engagement operation of the wet clutch is started, and the wet clutch is actuated to the engagement side in accordance with the required torque. At this time, because the engagement operation of the wet clutch is started from the standby position that is in the engagement side with respect to the disengagement position in the two-wheel drive state, even though the gap between the friction plates of the wet clutch is not made small, the switching responsivity from the two-wheel drive state to the four-wheel drive state can be improved. Furthermore, because the gap between the friction plates of the wet clutch can be secured, the drag resistance can be reduced in the two-wheel drive state, and the improvement in fuel efficiency can be achieved.

Therefore, in the driveline for a four-wheel drive vehicle that employs the wet clutch as the switching mechanism between the two-wheel drive state and the four-wheel drive state, both of the improvement in switching responsivity from the two-wheel drive state to the four-wheel drive state and the improvement in fuel efficiency can be achieved. In the two-wheel drive state, although the disconnect mechanism is switched to the non-transmission state and the wet clutch achieves a fully differential state (a state in which the rotating difference between the friction plates becomes maximum), the gap between the friction plates of the wet clutch can be secured, and therefore the occurrence of the seizure can be prevented.

Furthermore, the driveline for a four-wheel drive vehicle may have a clutch actuating device that includes a cam in which a locking groove is formed on an outer periphery, a fork which is fitted into the locking groove, and an actuator which rotates the cam, with the clutch actuating device actuating the wet clutch by rotating the cam through driving of the actuator and displacing the fork in an axial direction of the cam in accordance with a shape of the locking groove, in which the locking groove may be formed with a 2WD locking region that corresponds to the disengagement position of the wet clutch, a synchronization locking region that corresponds to the synchronous position of the wet clutch, a standby locking region that corresponds to the standby position of the wet clutch, and a 4WD locking region that corresponds to a maximum torque position where engagement torque of the wet clutch becomes maximum.

According to the driveline for a four-wheel drive vehicle which has the above structure, even though the rotational speed of the actuator is not increased or an inclination angle of the locking groove of the cam is not changed to a steep angle, the improvement in switching responsivity from the two-wheel drive state to the four-wheel drive state can be achieved. Specifically, in order to increase the rotational speed of the actuator, the actuator is required to be upsized, and therefore it can result in the cost increase. In addition, when the inclination angle of the locking groove is changed to a steep angle, the increase in a detection accuracy of the rotation angle of the actuator or the cam is required, and therefore it can also result in the cost increase. However, according to the above structure, even though the rotational speed of the actuator is not increased or an inclination angle of the locking groove of the cam is not changed to a steep angle, while the cost increase is avoided, the improvement in switching responsivity from the two-wheel drive state to the four-wheel drive state can be achieved.

In the driveline for a four-wheel drive vehicle, the 2WD locking region may be formed in a proximity of one end in the axial direction of the cam, the synchronization locking region may be formed in the side of the other end in the axial direction of the cam with respect to the 2WD locking region, the standby locking region may be formed in the side of the one end in the axial direction of the cam with respect to the synchronization locking region, and the 4WD locking region may be formed in the side of the other end in the axial direction of the cam with respect to the synchronization locking region. Accordingly, relative positions of the 2WD locking region, the synchronization locking region, the standby locking region, and the 4WD locking region in the axial direction of the cam are clearly defined.

In the driveline for a four-wheel drive vehicle, the 2WD locking region, the synchronization locking region, the standby locking region, and the 4WD locking region may be formed along a rotational direction of the cam in this order. Accordingly, relative positions of the 2WD locking region, the synchronization locking region, the standby locking region, and the 4WD locking region in the rotational direction of the cam are clearly defined. According to the above structure, when the cam is rotated in only one direction, the position of the locking groove where the fork is locked can be switched to the 2WD locking region, the synchronization locking region, the standby locking region, and the 4WD locking region in this order, and therefore the switching from the two-wheel drive state to the four-wheel drive state as described above can be easily conducted.

In the driveline for a four-wheel drive vehicle, the synchronization locking region extends in a direction orthogonal to the axial direction of the cam, and the orthogonal length of the synchronization locking region may be smaller than the orthogonal length of the 2WD locking region. In addition, the standby locking region extends in a direction orthogonal to the axial direction of the cam, and the orthogonal length of the standby locking region may be smaller than the orthogonal length of the 2WD locking region. Furthermore, position of the standby locking region in the axial direction of the cam may be set to be a position where the torque that is transmitted to the driven wheels becomes zero.

According to the present invention, in the driveline for a four-wheel drive vehicle that employs the wet clutch as the switching mechanism between the two-wheel drive state and the four-wheel drive state, both of the improvement in switching responsivity from the two-wheel drive state to the four-wheel drive state and the improvement in fuel efficiency can be achieved.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
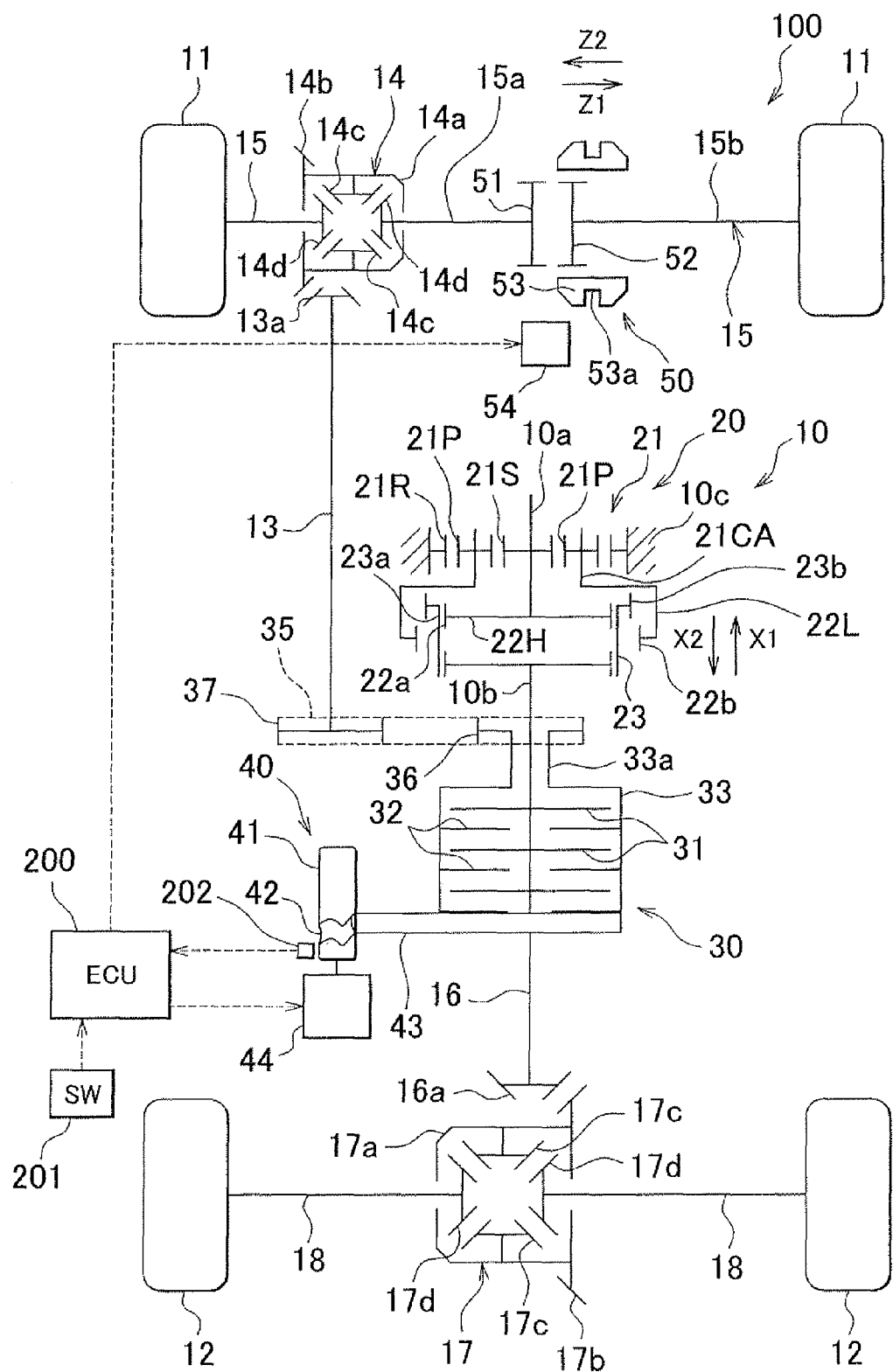
FIG. 1 is a schematic diagram that schematically shows an example of a driveline for a four-wheel drive vehicle according to an embodiment of the present invention.
Figure 2:
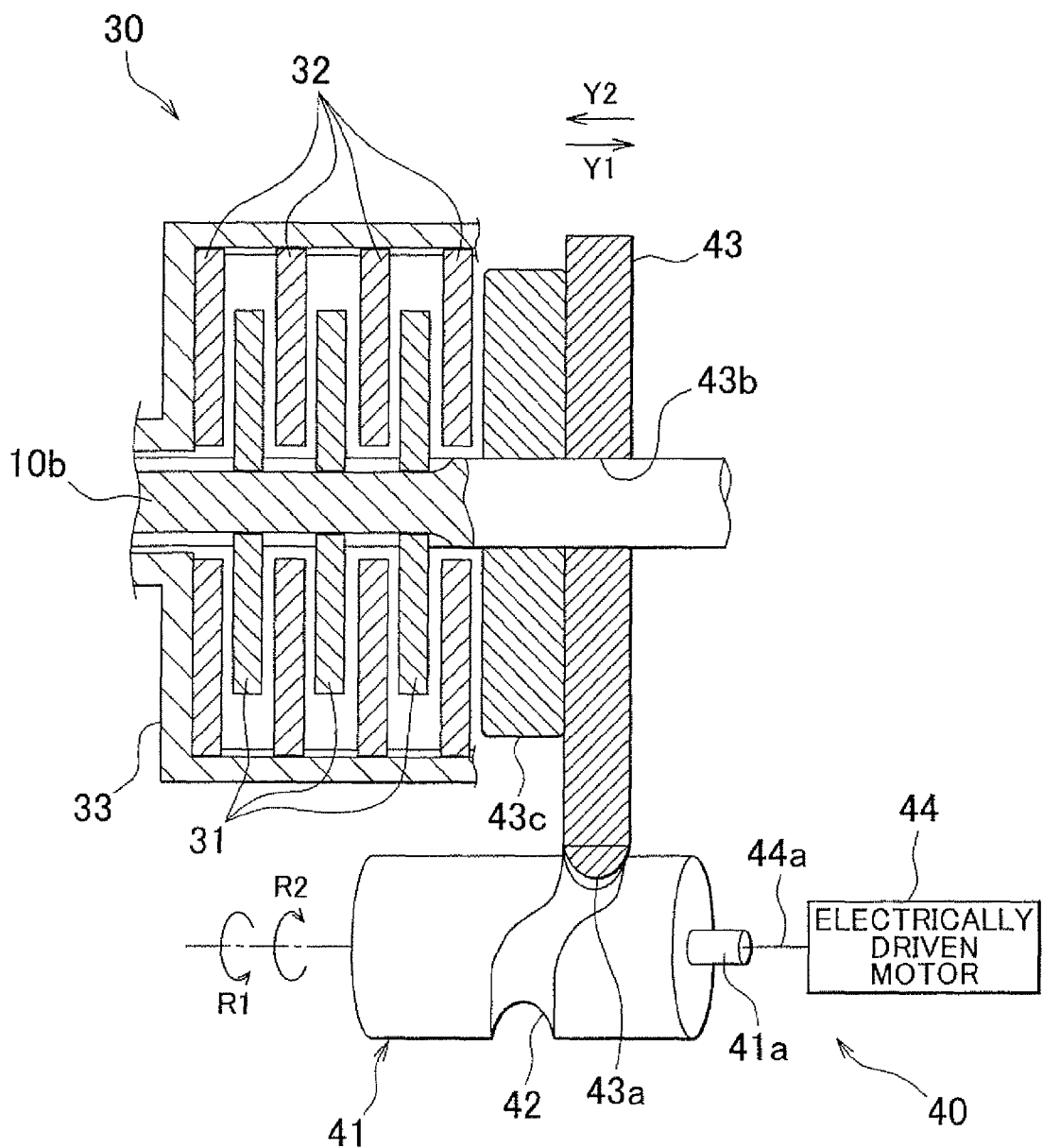
FIG. 2 is a view that shows a wet multi-plate clutch, a clutch actuating device and so on that are provided in a transfer of the driveline in FIG. 1.

Embodiments that embody the present invention will be described with reference to the attached drawings. FIG. 1 is a schematic diagram that schematically shows an example of a driveline for a four-wheel drive vehicle according to an embodiment of the present invention. FIG. 2 is a view that shows a wet multi-plate clutch, a clutch actuating device, and so on that are provided in a transfer of the driveline in FIG. 1.

FIG. 1 illustrates a driveline 100 for a rear-wheel drive based four-wheel drive vehicle. The driveline 100 has a structure that can distribute rotative power from a power source (not shown) to front wheels 11 and 11 and rear wheels 12 and 12 through a transfer (power distribution mechanism) 10. Specifically, when the driveline 100 is in the two-wheel drive state, the rotative power from the power source is transmitted to a rear propeller shaft 16 through the transfer 10, and thus a traveling state is achieved in which only the rear wheels 12 and 12 as main driving wheels are driven. On the other hand, when the driveline 100 is in the four-wheel drive state, the rotative power from the power source is transmitted to both of a front propeller shaft 13 and the rear propeller shaft 16 through the transfer 10, and thus the traveling state is achieved in which both of the front wheels 11 and 11 as auxiliary driving wheels and the rear wheels 12 and 12 as main driving wheels are driven. The power source may adopt an internal combustion engine such as a gasoline engine, a diesel engine, or an LPG engine, an electric motor such as a motor or a motor-generator, or a combination of the internal combustion engine and the electric motor.

In the transfer 10, torque transmission to the front propeller shaft 13 is conducted via a chain 35. The chain 35 is wound between a drive sprocket 36 that is disposed on an outer periphery of a small-diameter part 33a of a clutch case 33 described later and a driven sprocket 37 that is disposed in a rear end of the front propeller shaft 13. Torque can be transmitted from the drive sprocket 36 to the driven sprocket 37 and the front propeller shaft 13 through the chain 35.

The front propeller shaft 13 extends from the transfer 10 toward a front of the vehicle. The front propeller shaft 13 is coupled to right and left front drive shafts 15 and 15 through a front differential (differential mechanism) 14. The right and the left front drive shafts 15 and 15 are coupled to right and left front wheels 11 and 11.

Specifically, a ring gear 14b is integrally provided to a differential case 14a of the front differential 14. The ring gear 14b meshes with a drive pinion 13a that is integrally provided to a front end of the front propeller shaft 13. The front differential 14 may have any structures as long as it can conduct a differential operation in which a differential distribution of torque to the right and the left front drive shafts 15 and 15 is achieved. In FIG. 1, the front differential 14 that includes a pair of pinions 14c and 14c and a pair of side gears 14d and 14d is used. The pinions 14c and 14c and the side gears 14d and 14d are accommodated in the differential case 14a.

The rear propeller shaft 16 extends from the transfer 10 toward a rear of the vehicle. The rear propeller shaft 16 is coupled to right and left rear drive shafts 18 and 18 through a rear differential (differential mechanism) 17. The right and the left rear drive shafts 18 and 18 are coupled to right and left rear wheels 12 and 12. The structure and the functions of the rear differential 17 are the same as the front differential 14 as described above. That is, the rear differential 17 has a structure that includes a differential case 17a, a ring gear 17b that meshes with the drive pinion 16a which is provided to a rear end of the rear propeller shaft 16, pinions 17c and 17c, and side gears 17d and 17d.

The transfer 10 includes a shifting mechanism 20, a wet multi-plate clutch 30 as the 2WD/4WD switching mechanism, and a clutch actuating device 40.

When the driver operates a range selection lever (not shown) that is disposed in the vicinity of the driver's seat, the shifting mechanism 20 is shifted in a speed range to either one of a high speed range or a low speed range. In normal driving, the shifting mechanism 20 is shifted to the high speed range. On the other hand, in driving off road, especially, a climbing road, when the shifting mechanism 20 is shifted to the low speed range, larger torque than that in the normal driving can be obtained. Here, the structure that switches between the high speed range and the low speed range is not limited to the range selection lever, but may adopt any other operating means (for example, selector switch or the like).

As shown in FIG. 1, the shifting mechanism 20 includes a planetary gear mechanism 21, a high speed range piece 22H, a low speed range piece 22L, and a sleeve 23. The planetary gear mechanism 21 adopts a single pinion type as shown in FIG. 1, for example. Specifically, the planetary gear mechanism 21 has a structure that includes a sun gear 21S, a ring gear 21R that is disposed concentrically with the sun gear 21S, plural pinions 21P that mesh with the sun gear 21S and the ring gear 21R, and a carrier 21CA that holds the pinions 21P for rotation and revolution.

The sun gear 21S is coupled to an input shaft 10a of the transfer 10 so as to rotate together. The sun gear 21s is also provided with the high speed range piece 22H so as to rotate together. In this case, the high speed range piece 22H is integrally formed with the sun gear 21S in a manner that projecting in the side surface of the sun gear 21S, and an outer periphery of the high speed range piece 22H has external teeth 22a that are equally spaced.

The ring gear 21R is fixed to a transfer case 10c (a part thereof is shown in FIG. 1) of the transfer 10 so as not to move in the axial direction and rotate. The carrier 21CA is provided with the low speed range piece 22L so as to rotate together. An inner periphery of the low speed range piece 22L has internal teeth 22b that are equally spaced.

The sleeve 23 is installed on an outer surface of an output shaft 10b that is concentrically provided with the input shaft 10a through a hub (not shown) and the like so as to rotate together. The output shaft 10b is coupled to the rear propeller shaft 16 so as to rotate together. An inner periphery of the sleeve 23 has internal teeth 23a that can mesh with the external teeth 22a of the high speed range piece 22H and are equally spaced. In addition, an outer periphery of the sleeve 23 has external teeth 23b that can mesh with the internal teeth 22b of the low speed range piece 22L and are equally spaced.

The sleeve 23 is slid parallel to the output shaft 10b by a driving device (not shown). The sleeve 23 can slide between a first slide position where the internal teeth 23a and the external teeth 22a of the high speed range piece 22H mesh with each other and a second slide position where the external teeth 23b and the internal teeth 22b of the low speed range piece 22L mesh with each other. The driving device has a structure that includes a fork which slides the sleeve 23, an actuator such as an electrically driven motor, and a transmission mechanism which reduces rotative power generated in the electrically driven motor and converts it to linear driving force, for example.

The shifting mechanism 20 can hold the high speed range when the driveline 100 is in the two-wheel drive state and can switch between the high speed range and the low speed range when the driveline 100 is in the four-wheel drive state. Specifically, when the driveline 100 is in the four-wheel drive state, if the driver selects the high speed range, the sleeve 23 is slid to an X1 direction in FIG. 1 by the driving device. When the sleeve 23 is slid to the first slide position described above, the internal teeth 23a of the sleeve 23 mesh with the external teeth 22a of the high speed range piece 22H as shown in FIG. 1. Thus, a power transmission path for high speed range is secured such that the torque which is input to the input shaft 10a is transmitted in the order of the sun gear 21S, the sleeve 23, and the output shaft 10b, and the shifting mechanism 20 is switched to the high speed range. In the high speed range, the input shaft 10a and the output shaft 10b are directly coupled to each other.

On the other hand, when the driveline 100 is in the four-wheel drive state, if the driver selects the low speed range, the sleeve 23 is slid to an X2 direction in FIG. 1 by the driving device. When the sleeve 23 is slid to the second slide position described above, the external teeth 23b of the sleeve 23 mesh with the internal teeth 22b of the low speed range piece 22L. Thus, a power transmission path for low speed range is secured such that the torque which is input to the input shaft 10a is transmitted in the order of the carrier 21CA, the sleeve 23, and the output shaft 10b, and the shifting mechanism 20 is switched to the low speed range. In the low speed range, rotational speed of the input shaft 10a is reduced by the planetary gear mechanism 21 to be output to the output shaft 10b.

The wet multi-plate clutch 30 is engaged or disengaged through the operation of a mode switching selector switch 201 by the driver which is disposed in the vicinity of the driver's seat. Through engagement and disengagement operation of the wet multi-plate clutch 30, the driveline 100 is switched to either one of the two-wheel drive state or the four-wheel drive state. In this embodiment, the clutch actuating device 40 conducts the engagement and disengagement operation of the wet multi-plate clutch 30. Here, the structure that switches between the two-wheel drive state and the four-wheel drive state is not limited to the mode switching selector switch 201, but may adopt any other operating means (for example, lever or the like).

As shown in FIG. 1 and FIG. 2, the wet multi-plate clutch 30 has a structure in which plural clutch plates (friction plates) 31 and plural clutch discs (friction plates) 32 are alternately disposed in the axial direction of the output shaft 10*b*. The clutch plates 31 are spline-fitted to the outer periphery of the output shaft 10*b* and disposed to the output shaft 10*b* so as to rotate together and displace in the axial direction. The clutch discs 32 are spline-fitted to the inner periphery of the clutch case 33 that is formed in a cylindrical shape and disposed to the clutch case 33 so as to rotate together and displace in the axial direction.

The clutch case 33 is disposed to the output shaft 10*b* for relative rotation. On the other hand, the clutch case 33 cannot move in the axial direction. The small-diameter part 33*a* in a cylindrical shape is integrally formed in one end (front end) of the clutch case 33 in the axial direction. The drive sprocket 36 where the aforementioned chain 35 is wound is disposed to the outer periphery of the small-diameter part 33*a* so as to rotate together. The inside of the clutch case 33 is maintained in a fluid-tight manner with a seal member (not shown), and oil (hydraulic fluid) is filled in the inside of the clutch case 33. Here, the present embodiment is not limited to the structure in which oil is filled in the inside of the clutch case 33, but may adopt a structure in which oil that lubricates parts of the transfer 10 (oil in the transfer case 10*c*) is fed to the inside of the clutch case 33.

The clutch actuating device 40 includes a cam 41 in a cylindrical shape (or a column shape) for rotation, a fork 43 that can be displaced in an axial direction of the cam 41, and an actuator such as an electrically driven motor 44. A rotating shaft 41*a* of the cam 41 is coupled with an output shaft 44*a* of the electrically driven motor 44. The cam 41 is rotated (turned) in a positive rotation direction (R2 direction in FIG. 2) or in a reverse rotation direction (R1 direction in FIG. 2) about the rotating shaft 41*a* with the rotative power that is generated by the electrically driven motor 44. The rotative power that is generated by the electrically driven motor 44 is reduced through a reduction mechanism (not shown) and transmitted to the rotating shaft 41*a* of the cam 41. In the vicinity of the rotating shaft 41*a* of the cam 41, a rotation sensor 202 such as an encoder which detects a rotational position (rotation angle) of the cam 41 is disposed. Here, the present embodiment may adopt a structure that detects a rotation speed of the electrically driven motor 44 instead of detecting the rotational position of the cam 41.

Figure 3:
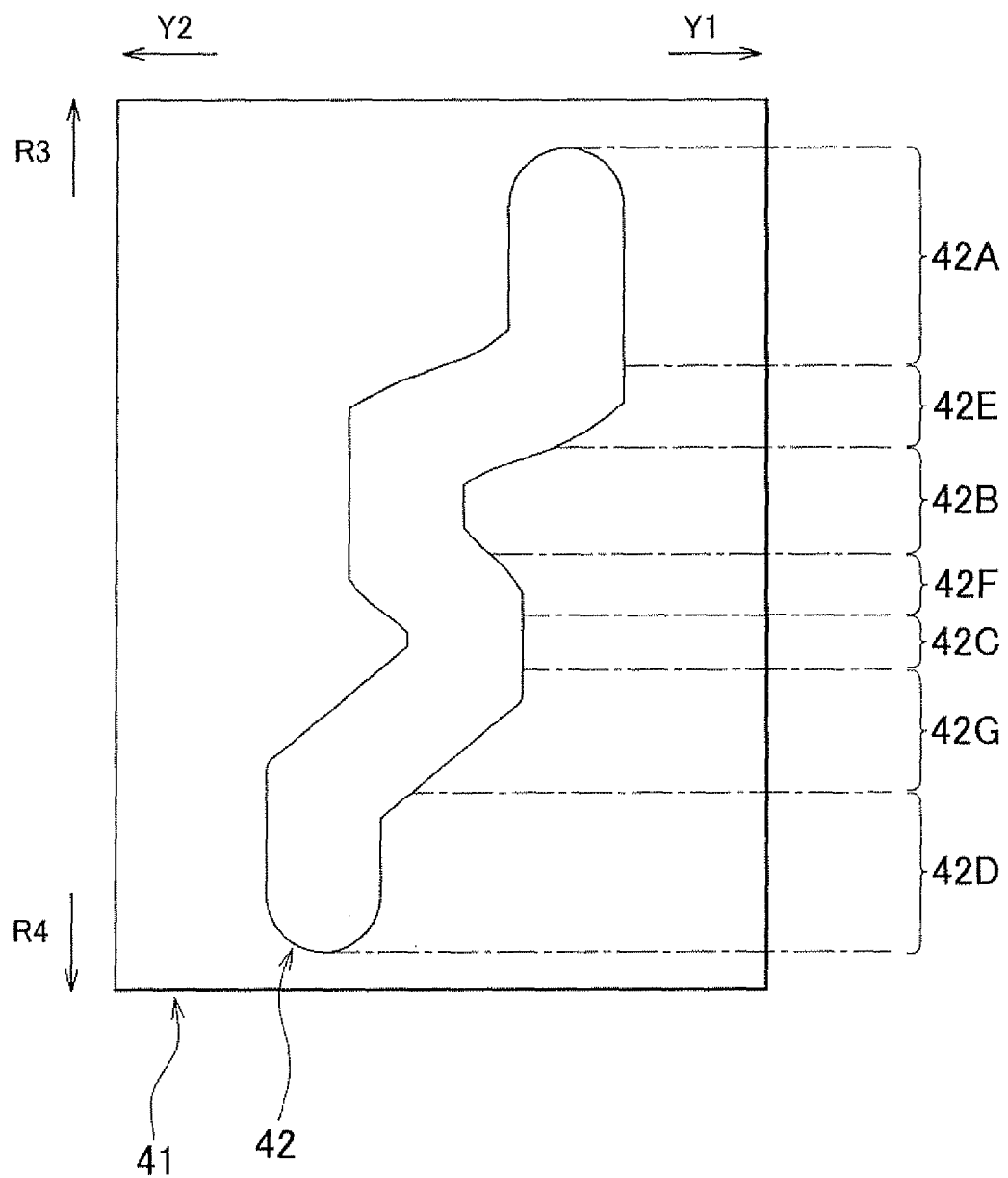
FIG. 3 is a developed view of a locking groove on a cam that is provided to the clutch actuating device in FIG. 2.

One locking groove 42 is formed in the outer periphery of the cam 41 (see FIG. 3 for details). The width of the locking groove 42 in the axial direction and the depth of the locking groove 42 from the outer periphery of the cam 41 are approximately constant from one end to the other end. The fork 43 is disposed in the other axial end (rear end) of the clutch case 33 and extends in a direction orthogonal to the axial direction of the cam 41. Generally hemisphere projection 43*a* is integrally provided to one end of the fork 43, and the projection 43*a* is fitted to the locking groove 42 of the cam 41. A through hole 43*b* where the output shaft 10*b* is inserted is formed in a midsection of the fork 43, and the fork 43 can displace in the axial direction with respect to the output shaft 10*b* and the clutch case 33. On the other hand, the fork 43 cannot rotate. A plate 43*c* is integrally provided to one surface (front surface) of the fork 43. The plate 43*c* can abut against one of the friction plates 31 and 32 (friction plate 32 in FIG. 2) of the wet multi-plate clutch 30. In addition, the plate 43*c* is arranged so as not to interfere with the clutch case 33. The plate 43*c* may be omitted, or a structure in which plural projections that protrude toward the side of the friction plates 31 and 32 are formed on the front surface of the fork 43 may be adopted instead of the plate 43*c*.

When the cam 41 is rotated through driving of the electrically driven motor 44, a locking position of the projection 43*a* of the fork 43 varies in the locking groove 42. Accordingly, the fork 43 is displaced in the axial direction in accordance with the shape of the locking groove 42, the position of the friction plates 31 and 32 of the wet multi-plate clutch 30 changes, and therefore the wet multi-plate clutch 30 is engaged or disengaged. Specifically, when the driver operates the mode switching selector switch 201 to select a two-wheel drive mode, the cam 41 is rotated in the reverse rotation direction (R1 direction in FIG. 2) through the driving of the electrically driven motor 44, and the fork 43 is slid to a direction away from the friction plates 31 and 32 (Y1 direction in FIG. 2). Then, when the fork 43 (plate 43*c*) is separated from the friction plates 31 and 32, the friction plates 31 and 32 are spaced apart, and the wet multi-plate clutch 30 is actuated to the disengagement side. When the fork 43 is slid to Y1 direction at a maximum, the wet multi-plate clutch 30 achieves a disengagement state. In the disengagement state, torque is not transmitted from the output shaft 10*b* to the clutch case 33, and the torque is not transmitted to the front wheels 11 and 11. Therefore, the driveline 100 is switched to the two-wheel drive state where only the rear wheels 12 and 12 are driven.

On the other hand, when the driver operates the mode switching selector switch 201 to select a four-wheel drive mode, the cam 41 is rotated in the positive rotation direction (R2 direction in FIG. 2) through the driving of the electrically driven motor 44, and the fork 43 is slid to a direction close to the friction plates 31 and 32 (Y1 direction in FIG. 2). Then, the fork 43 (plate 43*c*) pushes the friction plates 31 and 32, the friction plates 31 and 32 come close to each other, and the wet multi-plate clutch 30 is actuated to the engagement side. In an engagement state of the wet multi-plate clutch 30, torque is transmitted from the output shaft 10*b* to the clutch case 33, and the torque is transmitted to the front wheels 11 and 11 through the chain 35. Therefore, the driveline 100 is switched to the four-wheel drive state where the front wheels 11 and 11 and the rear wheels 12 and 12 are driven. In this case, as the fork 43 is slid to Y2 direction in FIG. 2, engagement torque (engagement capacity) of the wet multi-plate clutch 30 becomes large, and then transmission torque to the front wheels 11 and 11 by the wet multi-plate clutch 30 becomes large.

In this embodiment, as shown in FIG. 1, a disconnect mechanism 50 is provided to a right front drive shaft 15 of right and left front drive shafts 15 and 15. The disconnect mechanism 50 is constructed to switch between a transmission state in which the torque is transmitted between the front differential 14 and the right front wheel 11 and a non-transmission state (disconnect state) in which the torque is not transmitted.

Specifically, the right front drive shaft 15 is divided into an inner front drive shaft 15*a* that is located on a side of the front differential 14 and an outer front drive shaft 15*b* that is located on a side of the right front wheel 11. The disconnect mechanism 50 includes an inner engagement plate 51 that is attached to an outer end of the inner front drive shaft 15*a* in the axial direction, an outer engagement plate 52 that is attached to an inner end of the outer front drive shaft 15*b* in the axial direction, and a sleeve 53 that switches between connection and disconnection of the engagement plates 51 and 52.

The engagement plates 51 and 52 have the same diameters as one another, and splines are respectively formed on their outer peripheries. The inner periphery of the sleeve 53 is formed with splines that can engage with the splines which are formed on the outer periphery of the engagement plates 51 and 52. The outer periphery of the sleeve 53 is formed with a recess 53a, and a fork (not shown) is locked in the recess 53a. The fork is moved along the axial direction of the front drive shaft 15 through the driving of the actuator such as the electrically driven motor 54. When the fork is moved through the driving of the electrically driven motor 54, the sleeve 53 can move between a first slide position where the sleeve 53 engages with either one of the engagement plates 51 and 52 (outer engagement plate 52 in FIG. 1) only and a second slide position where the sleeve 53 engages with both of the engagement plates 51 and 52. Here, the disconnect mechanism 50 may have any structure that can switch between the transmission and the non-transmission of the torque between the side of the front differential 14 and the side of the front wheel 11, and the disposing location is not limited particularly.

The disconnect mechanism 50 is switched to the transmission state when the driveline 100 is in the four-wheel drive state and to the non-transmission state when the driveline 100 is in the two-wheel drive state. Specifically, when the driveline 100 is switched from the four-wheel drive state to the two-wheel drive state, the disconnect mechanism 50 is switched to the non-transmission state, and when the driveline 100 is switched from the two-wheel drive state to the four-wheel drive state, the disconnect mechanism 50 is switched to the transmission state.

Specifically, when the driver operates the mode switching selector switch 201 to select the two-wheel drive mode, the sleeve 53 is slid to a Z1 direction in FIG. 1. When the sleeve 53 is slid to the first slide position, the engagement of the sleeve 53 with the inner engagement plate 51 is released, and therefore the coupling of the engagement plates 51 and 52 is released. Accordingly, a state in which the front differential 14 is separated from the right front wheel 11 is achieved, and the disconnect mechanism 50 is switched to the non-transmission state where the torque transmission cannot be conducted between the front differential 14 and the right front wheel 11. In the non-transmission state, although the right and the left front wheels 11 and 11 respectively rotate, the differential case 14a of the front differential 14, the front propeller shaft 13, the clutch case 33, the friction plate 32, and the like become the non-rotating state. The switching of the disconnect mechanism 50 to the non-transmission state is conducted prior to the disengagement operation of the wet multi-plate clutch 30 that is described above.

On the other hand, when the driver operates the mode switching selector switch 201 to select the four-wheel drive mode, the sleeve 53 is slid to a Z2 direction in FIG. 1. When the sleeve 53 is slid to the second slide position, the sleeve 53 and the engagement plates 51 and 52 are engaged, and therefore the engagement plates 51 and 52 are coupled through the sleeve 53. Accordingly, a state in which the front differential 14 and the right front wheel 11 are coupled as a single unit is achieved, and the disconnect mechanism 50 is switched to the transmission state where the torque transmission can be conducted between the front differential 14 and the right front wheel 11. The switching of the disconnect mechanism 50 to the transmission state when the driveline 100 is switched from the two-wheel drive state to the four-wheel drive state will be described later.

The driveline 100 that is constructed as described above is controlled with an electronic control unit (ECU) 200 as a controller. The ECU 200 has a structure that includes, for example, a CPU, ROM, and RAM. The ROM stores various control programs and maps that are referred during the execution of the various control programs. The CPU executes various arithmetic processing in accordance with the various control programs and the maps that are stored in the ROM. The RAM is a memory that temporally stores computing results in the CPU and data which is input from sensors. The ECU 200 controls the electrically driven motors 44 and 54 and the like based on detection signals from the various sensors (such as the aforementioned rotation sensor 202) and settings of various switches (such as the aforementioned mode switching selector switch 201), and therefore the ECU 200 executes various controls of the driveline 100 that include a switching control from the two-wheel drive state to the four-wheel drive state which will be described later.

In this embodiment, the shape of the locking groove 42 of the cam 41 that is provided in the clutch actuating device 40 is formed to a shape that is shown in a developed view of FIG. 3. The Y1 direction and the Y2 direction in FIG. 3 are directions along the axial direction of the cam 41, and the R3 direction and the R4 direction are directions along the outer periphery of the cam 41. The Y1 direction and the Y2 direction in FIG. 3 respectively agree with the Y1 direction and the Y2 direction which are the slide direction of the fork 43 shown in FIG. 2. In addition, the R3 direction and the R4 direction in FIG. 3 respectively correspond to directions where the projection 43a of the fork 43 moves in the locking groove 42 when the cam 41 rotates in the R1 direction and the R2 direction in FIG. 2 (directions where the locking position of the projection 43a varies).

As shown in FIG. 3, the locking groove 42 is formed with a 2WD locking region 42A, a synchronization locking region 42B, a standby locking region 42C, and a 4WD locking region 42D in this order.

The 2WD locking region 42A is formed in an end of the locking groove 42 (an end in the R3 direction in FIG. 3). Among the locking regions 42A through 42D, the 2WD locking region 42A is located to the maximum in the Y1 direction in the axial direction of the cam 41. The 2WD locking region 42A extends in the direction orthogonal to the rotating shaft 41a of the cam 41. When the projection 43a of the fork 43 is locked in the 2WD locking region 42A, the fork 43 is slid to the maximum in the Y1 direction. Accordingly, the wet multi-plate clutch 30 becomes the disengagement state, and the driveline 100 becomes the two-wheel drive state. At this time, the friction plates 31 and 32 of the wet multi-plate clutch 30 are positioned in a disengagement position where the sum of gaps between the friction plates 31 and 32 (merely referred to as a gap between the friction plates 31 and 32) becomes maximum. That is, the 2WD locking region 42A is adapted to be the region corresponding to the aforementioned disengagement position of the wet multi-plate clutch 30.

The 4WD locking region 42D is formed in the other end of the locking groove 42 (an end in the R4 direction in FIG. 3). Among the locking regions 42A through 42D, the 4WD locking region 42D is located to the maximum in the Y2 direction in the axial direction of the cam 41. The 4WD locking region 42D extends in the direction orthogonal to the rotating shaft 41a of the cam 41. When the projection 43a of the fork 43 is locked in the 4WD locking region 42D, the fork 43 is slid to the maximum in the Y2 direction. Accordingly, the wet multi-plate clutch 30 becomes the engagement state, and the driveline 100 becomes the four-wheel drive state. In this case, engagement torque of the wet multi-plate clutch 30 becomes maximum, and therefore transmission torque to the front wheels 11 and 11 by the wet multi-plate clutch 30 becomes maximum. At this time, the friction plates 31 and 32 of the wet multi-plate clutch 30 are positioned in a maximum torque position where pressing force between the friction plates 31 and 32 becomes maximum. That is, the 4WD locking region 42D is adapted to be the region corresponding to the aforementioned maximum torque position of the wet multi-plate clutch 30. In the axial direction of the cam 41, the distance between the 2WD locking region 42A and the 4WD locking region 42D is adapted to be a distance in which the fork 43 can slide to a maximum extent.

The synchronization locking region 42B is formed in the side of the R4 direction with respect to the 2WD locking region 42A. The synchronization locking region 42B is arranged in the side of the Y2 direction with respect to the 2WD locking region 42A and in the side of the Y1 direction with respect to the 4WD locking region 42D. The synchronization locking region 42B extends in the direction orthogonal to the rotating shaft 41*a* of the cam 41, and the orthogonal length of the synchronization locking region 42B is adapted to be smaller than the orthogonal length of the 2WD locking region 42A.

When the projection 43*a* of the fork 43 is locked in the synchronization locking region 42B, the wet multi-plate clutch 30 is in the engagement state, and therefore torque can be transmitted to the front wheels 11 and 11 by the wet multi-plate clutch 30. In the present embodiment, the position of the synchronization locking region 42B in the axial direction is set to be a position where rotation of the front differential 14 and the right front wheel 11 can be synchronized through the torque transmission to the front wheels 11 and 11 by the wet multi-plate clutch 30. At this time, the friction plates 31 and 32 of the wet multi-plate clutch 30 are positioned in a synchronous position where the pressing force between the friction plates 31 and 32 is larger than that in the disengagement position and smaller than that in the maximum torque position described above. That is, the synchronization locking region 42B is adapted to be the region corresponding to the aforementioned synchronous position of the wet multi-plate clutch 30.

The standby locking region 42C is formed in the side of the R4 direction with respect to the synchronization locking region 42B. The standby locking region 42C is arranged in the side of the Y2 direction with respect to the 2WD locking region 42A and in the side of the Y1 direction with respect to the 4WD locking region 42D. In addition, the standby locking region 42C is arranged in the side of the Y1 direction with respect to the synchronization locking region 42B. The standby locking region 42C extends in the direction orthogonal to the rotating shaft 41*a* of the cam 41, and the orthogonal length of the standby locking region 42C is adapted to be smaller than the orthogonal length of the 2WD locking region 42A.

When the projection 43*a* of the fork 43 is locked in the standby locking region 42C, the wet multi-plate clutch 30 is in the engagement state. However, the engagement torque of the wet multi-plate clutch 30 is smaller than that in the synchronization locking region 42B. At this time, the friction plates 31 and 32 of the wet multi-plate clutch 30 are positioned in a standby position where the pressing force between the friction plates 31 and 32 is smaller than that in the synchronous position described above. That is, the standby locking region 42C is adapted to be the region corresponding to the aforementioned standby position of the wet multi-plate clutch 30. In the present embodiment, the position of the standby locking region 42C in the axial direction is set to be a position where the torque that is transmitted to the front wheels 11 and 11 becomes zero.

As shown in FIG. 3, switching locking regions 42E, 42F, and 42G are respectively formed between the respective locking regions 42A through 42D described above. Specifically, a first switching locking region 42E is formed between the 2WD locking region 42A and the synchronization locking region 42B. A second switching locking region 42F is formed between the synchronization locking region 42B and the standby locking region 42C. A third switching locking region 42G is formed between the standby locking region 42C and the 4WD locking region 42D.

These switching locking regions 42E, 42F, and 426 extend in the direction that is inclined to the rotating shaft 41*a* of the cam 41. The inclined direction of the first switching locking region 42E and the third switching locking region 42G is a direction in which the fork 43 slides to the Y2 direction when the cam 41 rotates to the R2 direction in FIG. 2 at the time that the projection 43*a* of the fork 43 is locked in the groove, and conversely, the direction is set such that the fork 43 slides to the Y1 direction when the cam 41 rotates to the R1 direction in FIG. 2.

On the other hand, the inclined direction of the second switching locking region 42F is a direction in which the fork 43 slides to the Y1 direction when the cam 41 rotates to the R2 direction in FIG. 2 at the time that the projection 43*a* of the fork 43 is locked in the groove, and conversely, the fork 43 slides to the Y2 direction when the cam 41 rotates to the R1 direction in FIG. 2.

The aforementioned locking regions 42A, 42B, 42C, and 42D are adapted to be regions where the projection 43*a* of the fork 43 is stably positioned. In other words, when the projection 43*a* of the fork 43 moves within the respective locking regions 42A, 42B, 42C, and 42D by the rotation of the cam 41, the positions of the friction plates 31 and 32 of the wet multi-plate clutch 30 are not changed.

On the other hand, the switching locking regions 42E, 42F, and 42G are different from the locking regions 42A, 42B, 42C, and 42D, and are adapted to be regions where the positions of the friction plates 31 and 32 of the wet multi-plate clutch 30 are changed when the projection 43*a* of the fork 43 moves within the respective switching locking regions 42E, 42F, and 42G by the rotation of the cam 41. Specifically, when the cam 41 rotates in the R2 direction in FIG. 2 at the time that the projection 43*a* of the fork 43 is locked in the first switching locking region 42E or the third switching locking region 42G, the fork 43 is slid to the Y2 direction, the pressing force between the friction plates 31 and 32 becomes large, and the wet multi-plate clutch 30 is actuated to the engagement side. Conversely, when the cam 41 rotates in the R1 direction in FIG. 2 at the time that the projection 43*a* of the fork 43 is locked in the first switching locking region 42E or the third switching locking region 42G, the fork 43 is slid to the Y1 direction, the pressing force between the friction plates 31 and 32 becomes small, and the wet multi-plate clutch 30 is actuated to the disengagement side.

On the other hand, when the cam 41 rotates in the R2 direction in FIG. 2 at the time that the projection 43*a* of the fork 43 is locked in the second switching locking region 42F, the fork 43 is slid to the Y1 direction, the pressing force between the friction plates 31 and 32 becomes small, and the wet multi-plate clutch 30 is actuated to the disengagement side. Conversely, when the cam 41 rotates in the R1 direction in FIG. 2 at the time that the projection 43*a* of the fork 43 is locked in the second switching locking region 42F, the fork 43 is slid to the Y2 direction, the pressing force between the friction plates 31 and 32 becomes large, and the wet multi-plate clutch 30 is actuated to the engagement side.

Figure 4:
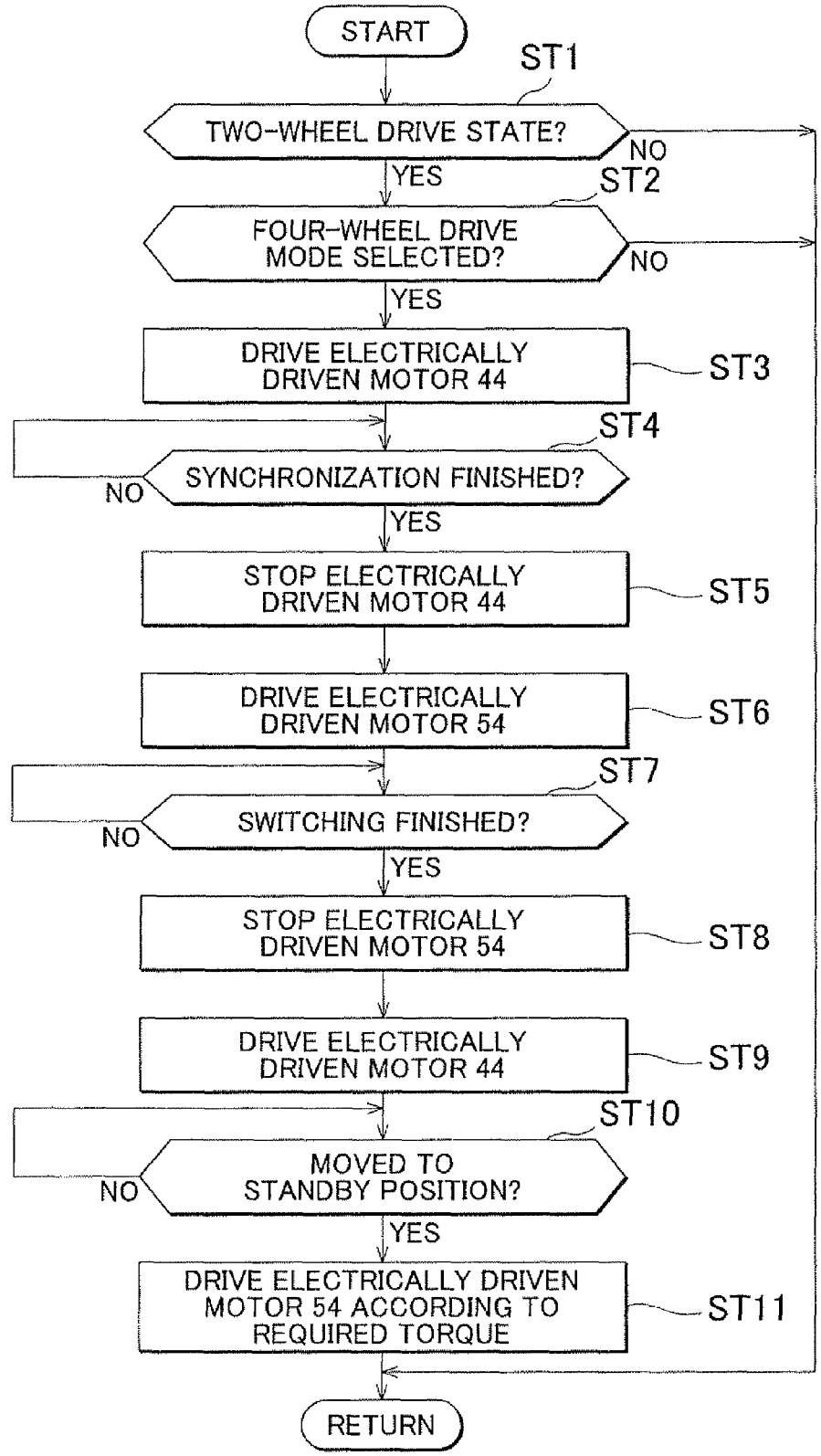
FIG. 4 is a flowchart that shows an example of changing control from a two-wheel drive state to a four-wheel drive state that is conducted in the driveline of FIG. 1.

Next, one example of switching control from the two-wheel drive state to the four-wheel drive state that is conducted in the driveline 100 will be described with reference to FIG. 4. The flowchart as shown in FIG. 4 is executed by the ECU 200 at a regular interval.

First, the ECU 200 determines in a step ST1 whether the driveline 100 is in the two-wheel drive state or not. The determination of the step ST1 can be executed by detecting settings of the mode switching selector switch 201. When the determination result of the step ST1 is a positive determination (YES), the process proceeds to a step ST2. On the other hand, when the determination result of the step ST1 is a negative determination (NO), the process proceeds to RETURN. When the driveline 100 is in the two-wheel drive state, the wet multi-plate clutch 30 is in the disengagement state. Specifically, the projection 43a of the fork 43 is locked in the 2WD locking region 42A among the respective regions in the locking groove 42 of the cam 41, and the friction plates 31 and 32 of the wet multi-plate clutch 30 are positioned in the disengagement position. In addition, the disconnect mechanism 50 is switched to the non-transmission state where the torque transmission is not conducted between the front differential 14 and the right front wheel 11.

Next, the ECU 200 determines in the step ST2 whether the four-wheel drive mode is selected or not. The determination of the step ST2 can be executed by detecting the settings of the mode switching selector switch 201. That is, in the step ST2, it is determined whether the driver operates the mode switching selector switch 201 to select the four-wheel drive mode or not. When the determination result of the step ST2 is a positive determination (YES), the process proceeds to a step ST3. On the other hand, when the determination result of the step ST2 is a negative determination (NO), the process proceeds to RETURN.

Next, in the step ST3, the ECU 200 controls to pass a current through the electrically driven motor 44 and drive the electrically driven motor 44 in the positive rotation direction (R2 direction in FIG. 2). The cam 41 rotates in the same R2 direction with the driving of the electrically driven motor 44, and the projection 43a of the fork 43 moves in the locking groove 42 to the R4 direction in FIG. 3. While the projection 43a of the fork 43 is positioned in the 2WD locking region 42A, the displacement of the fork 43 in the axial direction does not occur even if the cam 41 rotates. However, when the projection 43a of the fork 43 reaches the first switching locking region 42E, the displacement of the fork 43 in the axial direction occurs along with the rotation of the cam 41. In this case, the fork 43 is slid to the Y2 direction in FIG. 2 and FIG. 3 by the rotation of the cam 41 in the R2 direction.

Because of the slide of the fork 43 in the Y2 direction, the gap between the friction plates 31 and 32 of the wet multi-plate clutch 30 becomes small, and the engagement operation of the wet multi-plate clutch 30 is started. In this case, as the cam 41 rotates in the R2 direction, the projection 43a of the fork 43 moves in the first switching locking region 42E to the side of the R4 direction, and the fork 43 is slid to the side of the Y2 direction. Then, the engagement torque of the wet multi-plate clutch 30 becomes large, and the torque that is transmitted from the wet multi-plate clutch 30 to the front differential 14 through the chain 35 and the front propeller shaft 13 becomes large.

When the driveline 100 is switched from the two-wheel drive state to the four-wheel drive state, first, the disconnect mechanism 50 is required to be switched to the transmission state where the torque can be transmitted between the front differential 14 and the right front wheel 11. In order to switch the disconnect mechanism 50 to the transmission state, the rotation of the front differential 14 and that of the right front wheel 11 are required to be synchronized. Here, the rotation of the inner front drive shaft 15a and that of the outer front drive shaft 15b are required to be synchronized. However, when the driveline 100 is in the two-wheel drive state, because the disconnect mechanism 50 is in the non-transmission state and the wet multi-plate clutch 30 is in the disengagement state, the inner front drive shaft 15a and the outer front drive shaft 15b rotate in the opposite direction to each other. In the present embodiment, when the driveline 100 is switched from the two-wheel drive state to the four-wheel drive state, the wet multi-plate clutch 30 is actuated to the engagement side so that the inner front drive shaft 15a and the outer front drive shaft 15b are rotated in the same direction, and the rotation of the inner front drive shaft 15a and that of the outer front drive shaft 15b are synchronized.

Next, the ECU 200 determines in a step ST4 whether a synchronous operation as described above is finished or not, and more specifically, whether the rotation of the inner front drive shaft 15a and that of the outer front drive shaft 15b are synchronized or not. This determination can be executed on the basis of the output of the rotation sensor 202 that detects the rotational position of the cam 41. Specifically, as described above, the engagement torque of the wet multi-plate clutch 30 is determined in accordance with the rotational position of the cam 41. Accordingly, through the determination whether the projection 43a of the fork 43 is positioned in the synchronization locking region 42B or not on the basis of the output of the rotation sensor 202, it can be determined whether the synchronous operation is finished or not.

When the determination result of the step ST4 is a positive determination (YES), the process proceeds to the step ST5. On the other hand, when the determination result of the step ST4 is a negative determination (NO), the process enters into a standby state.

Next, in the step ST5, the ECU 200 controls to stop passing of the current through the electrically driven motor 44 to stop driving of the electrically driven motor 44. Accordingly, the rotation of the cam 41 stops, and the movement of the projection 43a of the fork 43 in the locking groove 42 stops. Then, the movement of the fork 43 stops, and the engagement operation of the wet multi-plate clutch 30 stops. In this state, the projection 43a of the fork 43 is locked in the synchronization locking region 42B in the locking groove 42 of the cam 41, and the friction plates 31 and 32 of the wet multi-plate clutch 30 are positioned in the synchronous position.

Next, the ECU 200 controls to pass a current through the electrically driven motor 54 to drive the electrically driven motor 54, and start a switching operation of the disconnect mechanism 50 to the transmission state. Through the driving of the electrically driven motor 54, the sleeve 53 is slid from the first slide position to a Z2 direction in FIG. 1, and the engagement operation of the sleeve 53 with the inner engagement plate 51 is started. When the sleeve 53 is slid to the second slide position, the engagement plates 51 and 52 are coupled with the sleeve 53, and the inner front drive shaft 15a and the outer front drive shaft 15b are coupled as a single unit. Accordingly, when the switching operation of the disconnect mechanism 50 to the transmission state is finished, the driveline 100 achieves the four-wheel drive state.

Next, the ECU 200 determines in a step ST7 whether the switching operation of the disconnect mechanism 50 to the transmission state as described above is finished or not. This determination can be executed on the basis of the output of a position sensor (not shown) that detects the slide position of the sleeve 53, for example. For example, the determination of the step ST7 can be executed through disposing the position sensor in the vicinity of the sleeve 53 and determining on the basis of the output of the position sensor whether the sleeve 53 is slid to the first slide position or not.

When the determination result of the step ST7 is a positive determination (YES), the process proceeds to the step ST8. On the other hand, when the determination result of the step ST7 is a negative determination (NO), the process enters into a standby state.

Next, in the step ST8, the ECU 200 controls to stop passing of the current through the electrically driven motor 54 to stop driving of the electrically driven motor 54. Accordingly, the sliding of the sleeve 53 to the Z2 direction is stopped.

Next, in the step ST9, the ECU 200 controls to resume passing a current through the electrically driven motor 44 and drive the electrically driven motor 44 in the positive rotation direction (R2 direction in FIG. 2). The cam 41 rotates in the same R2 direction with the driving of the electrically driven motor 44, and the projection 43a of the fork 43 moves in the locking groove 42 to the R4 direction in FIG. 3. While the projection 43a of the fork 43 is positioned in the synchronization locking region 42B, the displacement of the fork 43 in the axial direction does not occur even if the cam 41 rotates. However, when the projection 43a of the fork 43 reaches the second switching locking region 42F, the displacement of the fork 43 in the axial direction occurs along with the rotation of the cam 41. In this case, the fork 43 is slid to the Y1 direction in FIG. 2 and FIG. 3 by the rotation of the cam 41 in the R2 direction.

Because of the slide of the fork 43 in the Y1 direction, the pressing force between the friction plates 31 and 32 of the wet multi-plate clutch 30 becomes small, and a returning operation of the wet multi-plate clutch 30 to the disengagement side is conducted. In this case, as the cam 41 rotates in the R2 direction, the projection 43a of the fork 43 moves in the second switching locking region 42F to the side of the R2 direction, and the fork 43 is slid to the side of the Y1 direction. Then, the engagement torque of the wet multi-plate clutch 30 becomes small, and the torque that is transmitted from the wet multi-plate clutch 30 to the front wheels 11 and 11 through the chain 35 and the front propeller shaft 13 becomes small. In the present embodiment, the wet multi-plate clutch 30 is actuated to the disengagement side until the friction plates 31 and 32 of the wet multi-plate clutch 30 move to the standby position, and thus the torque that is transmitted to the front wheels 11 and 11 becomes zero. At this time, the driveline 100 has already been in the four-wheel drive state; however, the wet multi-plate clutch 30 is temporarily actuated to the disengagement side so that the friction plates 31 and 32 are returned to the standby position where the wet multi-plate clutch 30 is prepared for the engagement operation in a step ST11. In this state, the projection 43a of the fork 43 is positioned in the standby locking region 42C of the locking groove 42 of the cam 41.

Next, the ECU 200 determines in a step ST10 whether the friction plates 31 and 32 of the wet multi-plate clutch 30 are moved to the aforementioned standby position or not. This determination can be executed on the basis of the output of the rotation sensor 202 that detects the rotational position of the cam 41. That is, through the determination whether the projection 43a of the fork 43 is positioned in the standby locking region 42C or not on the basis of the output of the rotation sensor 202, the determination of the step ST10 can be executed.

When the determination result of the step ST10 is a positive determination (YES), the process proceeds to the step ST11.

On the other hand, when the determination result of the step ST10 is a negative determination (NO), the process enters into a standby state.

Next, in the step ST11, the ECU 200 controls to drive the electrically driven motor 44 in the positive rotation direction (R2 direction in FIG. 2) in accordance with the torque that is required of the front wheels 11 and 11. The cam 41 rotates in the same R2 direction with the driving of the electrically driven motor 44, and the projection 43a of the fork 43 moves in the locking groove 42 to the R4 direction in FIG. 3. While the projection 43a of the fork 43 is positioned in the standby locking region 42C, the displacement of the fork 43 in the axial direction does not occur even if the cam 41 rotates. However, when the projection 43a of the fork 43 reaches the third switching locking region 42G, the displacement of the fork 43 in the axial direction occurs along with the rotation of the cam 41. In this case, the fork 43 is slid to the Y2 direction in FIG. 2 and FIG. 3 by the rotation of the cam 41 in the R2 direction.

Because of the slide of the fork 43 in the Y2 direction, the pressing force between the friction plates 31 and 32 of the wet multi-plate clutch 30 becomes large, and the engagement operation of the wet multi-plate clutch 30 is started. In this case, as the cam 41 rotates in the R2 direction, the projection 43a of the fork 43 moves in the third switching locking region 42G to the side of the R4 direction, and the fork 43 is slid to the side of the Y2 direction. Accordingly, the engagement torque of the wet multi-plate clutch 30 becomes large, and the torque that is transmitted from the wet multi-plate clutch 30 to the front wheels 11 and 11 becomes large. In this case, the electrically driven motor 44 is driven to rotate the cam 41 in the R2 direction to the position where required torque of the front wheels 11 and 11 is obtained. When the projection 43a of the fork 43 reaches the 4WD locking region 42D, the pressing force between the friction plates 31 and 32 of the wet multi-plate clutch 30 becomes maximum. Therefore, engagement torque of the wet multi-plate clutch 30 becomes maximum, and transmission torque to the front wheels 11 and 11 by the wet multi-plate clutch 30 becomes maximum.

As described above, after the switching of the disconnect mechanism 50 to the transmission state is finished, the wet multi-plate clutch 30 is actuated to the disengagement side, and the friction plates 31 and 32 are returned to the standby position between the disengagement position in the two-wheel drive state described above and the synchronous position where the disconnect mechanism 50 is switched. Therefore, according to the present embodiment, following effects can be achieved.

That is, when the driveline 100 is switched from the two-wheel drive state to the four-wheel drive state, after the switching of the disconnect mechanism 50 to the transmission state is finished, the engagement operation of the wet multi-plate clutch 30 is started, and the wet multi-plate clutch 30 is actuated to the engagement side in accordance with the required torque. At this time, because the engagement operation of the wet multi-plate clutch 30 is started from the standby position that is in the engagement side with respect to the disengagement position in the two-wheel drive state, even though the gap between the friction plates 31 and 32 of the wet multi-plate clutch 30 is not made small, the switching responsivity from the two-wheel drive state to the four-wheel drive state can be improved. Furthermore, because the gap between the friction plates 31 and 32 of the wet multi-plate clutch 30 can be secured, when the driveline 100 is in the two-wheel drive state, the drag resistance can be reduced, and the improvement in fuel efficiency can be achieved.

Therefore, in the driveline 100 that employs the wet multi-plate clutch 30 as the switching mechanism between the two-wheel drive state and the four-wheel drive state, both of the improvement in switching responsivity from the two-wheel drive state to the four-wheel drive state and the improvement in fuel efficiency can be achieved. When the driveline 100 is in the two-wheel drive state, although the disconnect mechanism 50 is switched to the non-transmission state and the wet multi-plate clutch 30 achieves a fully differential state (a state in which the rotating difference between the friction plates 31 and 32 becomes maximum), the gap between the friction plates 31 and 32 of the wet multi-plate clutch 30 can be secured, and therefore the occurrence of the seizure can be prevented.

Furthermore, even though the rotational speed of the electrically driven motor 44 is not increased or an inclination angle of the locking groove 42 of the cam 41 is not changed to a steep angle, the improvement in switching responsivity from the two-wheel drive state to the four-wheel drive state can be achieved. Specifically, in order to increase the rotational speed of the electrically driven motor 44, the electrically driven motor 44 is required to be upsized, and therefore it can result in the cost increase. In addition, when the inclination angle of the locking groove 42 is changed to a steep angle, the increase in a detection accuracy of the rotation angle (rotational position) of the electrically driven motor 44 or the cam 41 is required, and therefore it can also result in the cost increase. However, according to the present embodiment, even though the rotational speed of the electrically driven motor 44 is not increased or an inclination angle of the locking groove 42 of the cam 41 is not changed to a steep angle, while the cost increase is avoided, the improvement in switching responsivity from the two-wheel drive state to the four-wheel drive state can be achieved.

As described above, the 2WD locking region 42A is formed in the proximity of one end in the axial direction of the cam 41, the synchronization locking region 42B is formed in the side of the other end in the axial direction of the cam 41 with respect to the 2WD locking region 42A, the standby locking region 42C is formed in the side of the one end in the axial direction of the cam 41 with respect to the synchronization locking region 42B, and the 4WD locking region 42D is formed in the side of the other end in the axial direction of the cam 41 with respect to the synchronization locking region 42B. The 2WD locking region 42A, the synchronization locking region 42B, the standby locking region 42C, and the 4WD locking region 42D are formed along the rotational direction of the cam 41 in this order. Accordingly, when the cam 41 is rotated in only one direction, the position of the locking groove 42 where the projection 43a of the fork 43 is locked can be switched to the 2WD locking region 42A, the synchronization locking region 42B, the standby locking region 42C, and the 4WD locking region 42D in this order, and therefore the switching from the two-wheel drive state to the four-wheel drive state as described above can be easily conducted.

The present invention is applicable to the driveline for a four-wheel drive vehicle that includes a wet clutch which can switch between the two-wheel drive state and the four-wheel drive state, and a disconnect mechanism which switches transmission/non-transmission of torque between one of right and left wheels as driven wheels in the two-wheel drive state and a differential mechanism that is provided between the right and the left wheels.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A driveline for a four-wheel drive vehicle, comprising:
    a wet clutch that switches between a two-wheel drive state and a four-wheel drive state; and
    a disconnect mechanism that, in the two-wheel drive state, switches to a non-transmission state in which torque is not transmitted between one of right and left wheels as driven wheels and a differential mechanism that is provided between the right and the left wheels, and
    in the four-wheel drive state, switches to a transmission state in which torque is transmitted between the differential mechanism and the one of the right and the left wheels, wherein
    when the driveline is switched from the two-wheel drive state to the four-wheel drive state, the wet clutch is actuated to an engagement side, and thus the rotation of the differential mechanism and the rotation of the one of the wheels are synchronized, and after synchronization is finished, the disconnect mechanism is switched to the transmission state, and after switching is finished, the wet clutch is actuated to a disengagement side and returns to a standby position between a disengagement position in the two-wheel drive state and a synchronous position in which the disconnect mechanism is switched.

2. The driveline for a four-wheel drive vehicle according to claim 1, further comprising:
    a clutch actuating device that includes a cam in which a locking groove is formed on an outer periphery, a fork which is fitted into the locking groove, and an actuator which rotates the cam, the clutch actuating device actuating the wet clutch by rotating the cam through driving of the actuator and displacing the fork in an axial direction of the cam in accordance with a shape of the locking groove, wherein
    the locking groove is formed with a 2WD locking region that corresponds to the disengagement position of the wet clutch, a synchronization locking region that corresponds to the synchronous position of the wet clutch, a standby locking region that corresponds to the standby position of the wet clutch, and a 4WD locking region that corresponds to a maximum torque position where engagement torque of the wet clutch becomes maximum.

3. The driveline for a four-wheel drive vehicle according to claim 2, wherein
    the 2WD locking region is formed in a proximity of one end in the axial direction of the cam, the synchronization locking region is formed in the side of the other end in the axial direction of the cam with respect to the 2WD locking region, the standby locking region is formed in the side of the one end in the axial direction of the cam with respect to the synchronization locking region, and the 4WD locking region is formed in the side of the other end in the axial direction of the cam with respect to the synchronization locking region.

4. The driveline for a four-wheel drive vehicle according to claim 3, wherein the 2WD locking region, the synchronization locking region, the standby locking region, and the 4WD locking region are formed along a rotational direction of the cam in this order.

5. The driveline for a four-wheel drive vehicle according to claim 3, wherein
the synchronization locking region extends in a direction orthogonal to the axial direction of the cam, and the orthogonal length of the synchronization locking region is smaller than the orthogonal length of the 2WD locking region.

6. The driveline for a four-wheel drive vehicle according to claim 3, wherein
the standby locking region extends in a direction orthogonal to the axial direction of the cam, and the orthogonal length of the standby locking region is smaller than the orthogonal length of the 2WD locking region.

7. The driveline for a four-wheel drive vehicle according to claim 2, wherein
position of the standby locking region in the axial direction of the cam is set to be a position where the torque that is transmitted to the driven wheels becomes zero.

* * * * *